United States Patent

Hicks

[11] 3,937,494
[45] Feb. 10, 1976

[54] BLEEDING PROTECTIVE CASING ASSEMBLY FOR BEARING SYSTEM

[75] Inventor: George E. Hicks, Fresno, Calif.

[73] Assignee: Weather Tec Corporation, Fresno, Calif.

[22] Filed: Sept. 13, 1973

[21] Appl. No.: 396,836

[52] U.S. Cl. ............... 285/13; 285/281; 308/36.1; 251/145; 137/525.3
[51] Int. Cl.² .................................... F16L 27/08
[58] Field of Search............ 308/36.1, 36.2, 187.1; 137/525, 525.3, 525.5; 251/145; 285/13, 14, 281

[56] References Cited
UNITED STATES PATENTS

| | | | |
|---|---|---|---|
| 2,747,609 | 5/1956 | Sekera | 137/525.3 X |
| 3,764,073 | 10/1973 | Costa | 285/14 X |

FOREIGN PATENTS OR APPLICATIONS

| | | | |
|---|---|---|---|
| 1,163,107 | 2/1964 | Germany | 137/525.3 |

*Primary Examiner*—Alan Cohan
*Attorney, Agent, or Firm*—Poms, Smith, Lande & Glenny

[57] ABSTRACT

A bearing system for relatively rotatable liquid conduits such as a rotating sprinkler head mounted on a fixed riser, including a two-piece casing assembly for shielding operative parts of the bearing from intrusion of external dirt and water-borne abrasive material, while permitting leakage liquid within the casing assembly to bleed outwardly, thereby preventing excessive liquid pressure in the assembly. The illustrative system includes a bearing housing having a central vertical bore and a tubular spindle rotatably mounted in the bore and projecting thereabove for attachment to a sprinkler head. The system includes spaced upper and lower seals between the fixed and rotating parts, and an external helical spring for maintaining the seals under compression, thereby minimizing entry of outside dirt and water-borne abrasive material into the annular space between the spindle and bore. A protective casing assembly forms a chamber about the spring, and includes a lower cup-shaped annular case surrounding the lower portion of the spring and having a lower internal flange underlying the spring, and an upper annular cap surrounding the upper portion of the spring and case, and provided with an upper internal flange immediately overlying the spring, and a depending cylindrical sidewall in loose telescoping relation with the case sidewall and terminating downwardly in an inturned resilient feathered edge in light peripheral contact with the case sidewall for permitting bleeding of leakage water from the chamber. The feathered edge may be provided with one or more slits to facilitate the bleeding. The feathered edge thus functions as a check valve, operable at very low actuating liquid pressure.

6 Claims, 5 Drawing Figures

U.S. Patent  Feb. 10, 1976  3,937,494
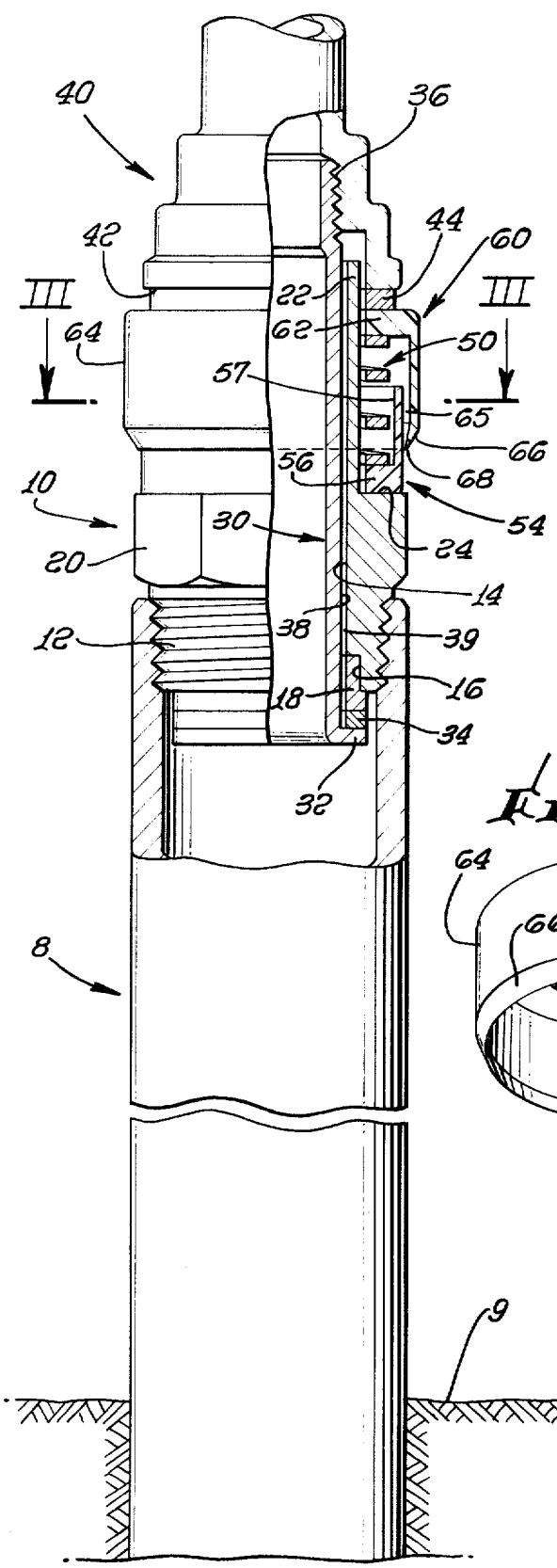
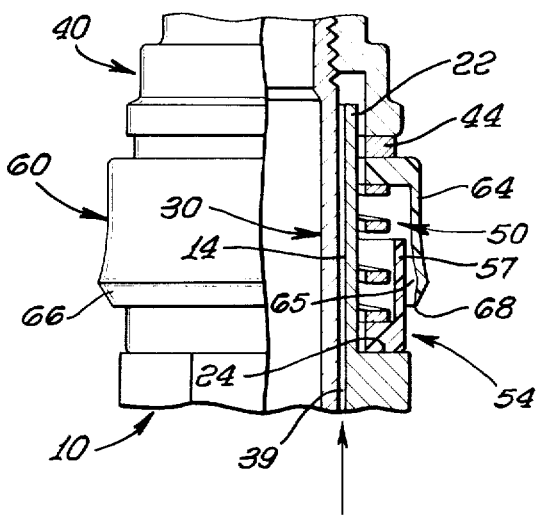
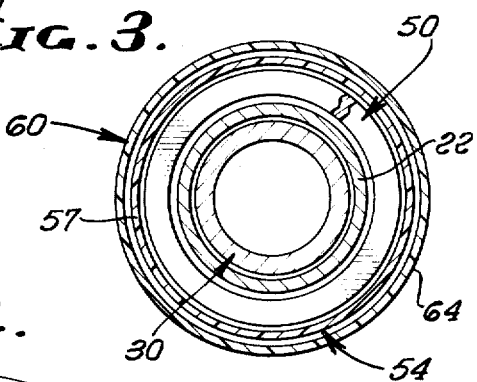
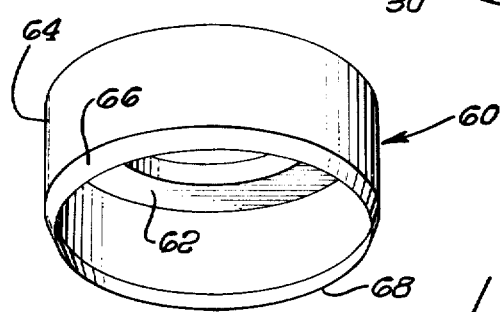
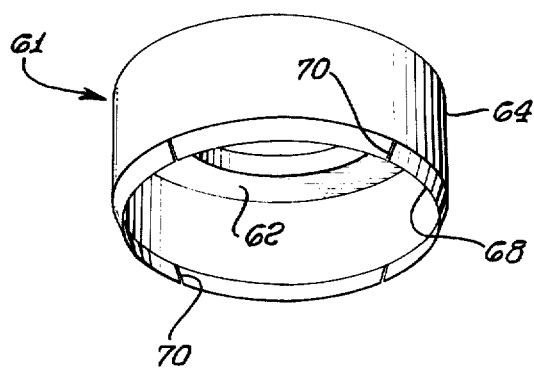

BLEEDING PROTECTIVE CASING ASSEMBLY FOR BEARING SYSTEM

BACKGROUND AND FIELD OF THE INVENTION

The present invention relates generally to bearing systems for relatively rotatable conduits conducting a liquid, and more particularly to such a bearing system including a protective casing surrounding operative parts of the system to minimize entry of external dirt and other abrasive material, the casing including means permitting bleeding therefrom of leakage liquid which collects in the casing during use.

The invention finds particularly advantageous application with rotatable sprinklers widely used for irrigation purposes, and a preferred embodiment of the invention will be described in connection with such an application. However, it will be seen that the invention is not limited to such an environment, but can find application in other environments as well, where two relatively rotatable liquid-carrying conduits are connected together in an environment having dirt, dust and other abrasive material whose entry would be harmful to the operative parts of the bearing system.

A typical bearing construction of the type under discussion consists of a bearing housing having a cylindrical bore therethrough and an external upwardly directed annular shoulder. Rotatably mounted within the housing bore is a tubular spindle having a lower annular flange, the spindle upper end projecting above the bearing housing and being connected to an outlet member such as a sprinkler head. The outlet member is provided with an annular downwardly directed shoulder in coaxial alignment with the shoulder of the bearing housing. Annular seals are provided, including lower seal means between the spindle flange and the lower end of the bearing housing, and upper seal means abutting the annular shoulder of the outlet member.

Resilient means are provided for maintaining the upper and lower seal means under a predetermined amount of compression, typically including a helical spring which bears at its lower end against the upwardly directed annular shoulder of the bearing housing, and at its upper end against the annular seal means contacting the downwardly directed shoulder of the outlet member. It is found that external mud and dirt become encrusted on the helical spring, and abrasive particles of such dirt and mud can pass into the small annular clearance between the rotatable spindle and the fixed bore of the bearing, scoring and galling those otherwise smooth surfaces, and eventually binding the spindle against rotation.

In order to minimize entry of abrasive particles of mud, dirt and dust into the operative parts of the bearing system, it has been previously proposed to provide an annular cover in the form of an integral corrugated bellows of suitable material such as plastic, surrounding the spring. However, difficulties arise in the use of such a bellows because the internal seals of the bearing system inevitably leak, and pressurized liquid from the supply conduit collects within the annular chamber formed by the bellows. The force of this pressurized liquid effectively adds to the force of the spring itself, imposing much more thrust load on the rotating parts, particularly the upper seal, than was intended in design, eventually leading to binding of the parts. The strength of the spring is so chosen as to impose a predetermined optimum force on the relatively rotable seal components. Hence the spring should be unrestricted in its free longitudinal expansion to maintain that force despite manufacturing tolerances, and to gradually continue that expansion as the seals wear over their useful life.

In accordance with the present invention, there is provided an annular casing assembly surrounding the helical spring of the bearing system and forming effectively the outer wall of a chamber within which the spring is disposed. The casing assembly includes a lower annular case of suitable rigid material such as metal or a rigid plastic, having a smooth cylindrical outer wall and an inwardly extending lower flange underlying the helical spring. The casing assembly includes also an upper annular cap having an internal flange overlying the upper end of the helical spring, and a downwardly depending generally cylindrical sidewall spaced slightly outwardly from the outer sidewall of the annular case, the depending sidewall of the cap being provided at its lower end with an inturned feathered edge which lightly contacts the outer cylindrical sidewall of the case. The material of which the sidewall and feathered edge of the cap are formed is resilient and flexible, so that even a very slight liquid pressure within the annular space between the sidewalls of the cap and case will cause the feathered edge to move slightly outwardly away from direct contact with the case cylindrical sidewall. The small opening thus provided permits liquid collected in the chamber to bleed outwardly and downwardly, thereby preventing the building up of liquid pressure within the annular chamber formed by the casing assembly. When no liquid is in the annular chamber, the feathered edge of the cap remains in contact with the case sidewall, thus preventing entry of external abrasive material. In order to facilitate the opening movement of the feathered edge away from the case sidewall during bleeding, it may be desirable to provide one or more vertical slits in the lower portion of the sidewall of the cap, extending upwardly a short distance from the feathered edge.

It will accordingly be seen that the casing assembly, and more particularly the contact between the lowermost feathered edge of the cap and the cylindrical sidewall of the case, constitute in effect a check valve permitting outward and downward flow of liquid, but preventing flow of any material in the opposite direction.

It is accordingly a principal object of the present invention to disclose and provide a novel protective casing assembly for a bearing system connecting two relatively rotatable liquid conducting conduits. Other and additional objects and purposes are to provide a novel two-piece casing assembly for forming, with a bearing housing, an annular chamber for housing a helical spring; to provide such a casing assembly including check valve means for permitting bleeding exit of leakage water from the chamber, while barring entry of external abrasive material; to provide such a bleeding protective means which facilitates assembly during manufacture; and for other and additional purposes as will become clear from a reading of the following description of a preferred embodiment of the invention, taken in connection with the accompanying drawings.

BRIEF DESCRIPTION OF THE DRAWINGS

FIG. 1 is a vertical elevational view, partially in section, showing a bearing system in accordance with the present invention mounted on the upper end of a riser.

FIG. 2 is a side elevational view, partially in section, of the upper portion of the bearing system, showing the feathered edge of the casing assembly cap in its open position.

FIG. 3 is a sectional view looking downwardly on the arrows III—III of FIG. 1.

FIG. 4 is a lower perspective view of the casing cap of the invention.

FIG. 5 is a lower perspective view, similar to FIG. 4, showing a modified form of the casing cap, including slits provided in its lower portion and feathered edge.

DETAILED DESCRIPTION

A bearing system in accordance with the present invention is shown in FIG. 1, mounted on the upper end of a vertically oriented riser indicated generally at 8, projecting upwardly from ground 9. Riser 8 is connected through conventional conduits, preferably underground, to a source of water under pressure, including conventional timing devices, valves and the like, which form no part of the present invention and hence not illustrated or described further.

The present bearing system includes a bearing housing indicated generally at 10, typically made of brass or an equivalent rigid material, and is provided with a lower externally threaded portion 12 which is threaded into the upper end of riser 8 as indicated. Bearing housing 10 is tubular, having formed therein throughout virtually its entire length a vertically oriented cylindrical bore 14 terminating downwardly in an enlarged counterbore 16 receiving therein an annular bearing seal member 18. Bearing housing 10 includes a conventional polygonal portion 20 for engagement with a wrench, and the upper portion of the bearing housing constitutes an elongated sleeve 22, the housing having an upwardly directed annular shoulder 24 at the juncture of portion 20 and sleeve 22.

Rotatably mounted within bearing housing 10 is a tubular spindle indicated generally at 30, made of a suitable rigid material such as steel and provided at its lower end with an out-turned annular flange 32 on which is mounted an annular seal member 34 in contact with seal member 18 previously mentioned. The upper end of spindle 30 is threaded at 36, and is thereby attached to the lower portion of an outlet member indicated generally at 40 which may, for example, be a conventional sprinkler head. The outer cylindrical wall 38 of the spindle is spaced inwardly from bore 14 by a small annular clearance 39. Outlet member 40 provides a downwardly directed annular shoulder 42 in vertical alignment with upwardly directed annular shoulder 24 of the bearing housing. An annular bearing seal 44 is in slidable contact with shoulder 42.

Resilient means are provided for urging spindle 30 upwardly relative to bearing housing 10, thereby to maintain under some compressive stress the lower and upper bearing seal means. Such resilient means are here shown as a helical spring indicated generally at 50, surrounding a central portion of bearing sleeve 22.

The casing assembly of the present invention constitutes the upper, lower and outer sidewalls of an annular chamber housing spring 50, the inner wall of the chamber being provided by the outer cylindrical wall of bearing sleeve portion 22. A cup-shaped case indicated generally at 54 includes an integrally formed inwardly extending annular flange 56 resting upon annular shoulder 24 and an upwardly extending cylindrical wall 57 surrounding the lower portion of spring 50 and having a smooth outer wall. Case 54 is desirably made of a rigid material such as light metal or, preferably, a suitable plastic material.

Above case 54 is a casing cap indicated generally at 60 and including an integrally formed inwardly extending flange 62, resting upon the upper coil of spring 50 and abutting upwardly the bearing seal 44. Casing cap 60 also includes a downwardly depending generally cylindrical sidewall 64, which is arranged in loose telescoping relation with the upstanding sidewall 57 of case 54, thus forming a narrow annular clearance space 65 between the sidewalls of the cap and case. The cap sidewall 64 terminates downwardly in an in-turned lip 66 of tapered, diminishing cross-section, terminating in a feathered edge 68 which is in light peripheral contact with the smooth outer cylindrical sidewall 57 of the case 54. The cap 60, and particularly the lower in turned tapered lip 66, is made of a flexible, resilient elastomer, which may be easily stretched slightly outwardly by the force of water or other liquid collected in the annular space 65 between the sidewalls of the case and cap.

In FIG. 2 the parts are shown under operative conditions, with the lower portion of cap sidewall 64 stretched outwardly, so that the lowermost feathered edge 68 of that sidewall is out of contact with sidewall 57 of case 54. Despite the presence of the lower seal means, including seal members 18 and 34, nevertheless some water will leak through that seal means from the interior of riser 8. As indicated by the arrow beneath FIG. 2, such leakage water passes upwardly along the narrow annular clearance 39 between the outer cylindrical wall 38 of spindle 30 and the bore 14 of bearing housing 10. In the upper portion of the bearing system, the leakage water continues across the top of bearing sleeve 22 and thence downwardly past bearing seal 44 and, continuing downwardly, into the annular chamber in which spring 50 is housed. Initially, such leakage water will fill the interior of case 54. When that volume has been filled with the leakage water, it will be seen that additional leakage water will fill the narrow annular space 65 between the sidewall of the cap and case, and that the force of that water causes the cylindrical sidewall 64 to distend, so that the parts assume the position shown in somewhat exaggerated relation in FIG. 2. Under these conditions, leakage water is permitted to bleed downwardly out of the annular space 65, thereby preventing the building up of liquid pressure within the annular chamber housing the spring 50. Typically, the bleeding water drips downwardly along the outer surfaces of the bearing housing 10 and riser 8, to be eventually absorbed in the ground immediately surrounding the riser.

The casing cap 60 is shown in greater detail in the perspective view of FIG. 4, and FIG. 5 shows an alternative form of the casing cap, there indicated generally at 61. Casing cap 61 is identical to casing cap 60, except in being provided with one or more vertically disposed slits 70 in the lower portion of the sidewall 64, extending downwardly to the feathered edge 68. Under some circumstances it may be desirable to provide such slits, in order to facilitate the opening of the passageway for leakage water to exit from the chamber housing spring 50, as above described.

Accordingly, there is here provided a bearing system including a casing assembly for protectively housing the helical spring of the bearing system in an annular chamber surrounding the bearing housing proper, and provided with check valve means fo ensuring bleeding exit of leakage water collecting in the chamber and for preventing external dirt and other material from entering into the operative parts of the system, specifically the annular space 39 between the relatively rotating parts.

Modifications and changes from the preferred forms of the invention hereinabove described and illustrated are within the contemplation of the invention, and are intended to be embraced within the scope of the appended claims.

I claim:

1. A longitudinally expansible casing assembly for shielding internal operative members from the entrance of external dirt comprising:

outer wall means forming a vertically oriented annular chamber surrounding the operative members and subject to gradual leakage of liquid thereinto, said outer wall means including an annular cup-shaped case having a generally cylindrical outer sidewall and an open top, and an annular cap covering the open top of the case, including a downwardly depending sidewall disposed concentrically outwardly of the case sidewall in longitudinally expansible telescoping relation therewith, and check valve means for allowing liquid to bleed downwardly out of the chamber.

2. The invention as defined in claim 1 wherein the cap sidewall terminates downwardly in an inturned lip having a resilient feathered edge in light peripheral contact with the case sidewall, constituting said check valve means.

3. The invention as defined in claim 2 wherein said operative members include resilient means under compressive stress, opposite ends of the resilient means bearing against said case and cap.

4. The invention as defined in claim 2 wherein said operative members include a bearing system for first and second relatively rotatable liquid conduits comprising a bearing housing adapted to be connected to a first liquid conduit and provided with a cylindrical bore therethrough, and a tubular spindle rotatably mounted within the housing bore and adapted to be connected to a second liquid conduit.

5. The invention as defined in claim 4 wherein the first liquid conduit constitutes a fixed source of liquid under pressure, and the second liquid conduit constitutes an outlet member.

6. The invention as defined in claim 2 wherein said lip has formed therein a slit intersecting the feathered edge.

* * * * *